United States Patent [19]

Das et al.

[11] Patent Number: 4,650,839

[45] Date of Patent: Mar. 17, 1987

[54] THERMOSETTABLE MODIFIED PHENOLIC IMIDE RESINS

[75] Inventors: Sajal Das, Parsippany; Dusan C. Prevorsek, Morristown, both of N.J.

[73] Assignee: Allied Corporation, Morris Township, N.J.

[21] Appl. No.: 821,624

[22] Filed: Jan. 23, 1986

[51] Int. Cl.[4] .......................... C08G 8/28; C08G 8/36
[52] U.S. Cl. .................................. 525/504; 525/471; 528/149; 528/150; 528/153
[58] Field of Search ................ 525/504, 471; 528/149, 528/150, 153

[56] References Cited

U.S. PATENT DOCUMENTS

| | | | |
|---|---|---|---|
| 3,444,137 | 5/1969 | Higginbottom et al. | 525/504 X |
| 3,448,079 | 6/1969 | Grigat et al. | 525/504 |
| 3,717,615 | 2/1973 | Holub et al. | 525/504 |
| 3,839,264 | 10/1974 | Schmidt et al. | |
| 3,966,670 | 6/1976 | Grazen et al. | |
| 4,022,755 | 5/1977 | Tanigaichi et al. | 525/504 |
| 4,026,913 | 5/1977 | Tanigaichi et al. | |
| 4,041,796 | 8/1977 | Shishido. | |
| 4,157,360 | 6/1979 | Prevorsek et al. | |
| 4,218,361 | 8/1980 | Searfoss et al. | |
| 4,219,452 | 8/1980 | Littlefield. | |
| 4,268,657 | 5/1981 | Manzara. | |
| 4,304,896 | 12/1981 | Keller et al. | 528/9 |

FOREIGN PATENT DOCUMENTS

| | | |
|---|---|---|
| 2546290 | 4/1977 | Fed. Rep. of Germany. |
| 2549529 | 5/1977 | Fed. Rep. of Germany. |
| 58-34822 | 3/1983 | Japan. |
| 59-149918 | 8/1984 | Japan. |
| 973377 | 10/1964 | United Kingdom. |
| 1026032 | 4/1966 | United Kingdom. |
| 1070364 | 6/1967 | United Kingdom. |
| 1095663 | 12/1967 | United Kingdom. |

OTHER PUBLICATIONS

Macromolecules, 17, Aug., 1984, 1614–1624, Snow et al.
D. F. Loncrini et al., J. Polym. Sci., vol. 4, p. 440, (1966).
S. Das et al., J. Appl. Polym. Sci., vol. 26, p. 957, (1980).
Kunst-Stoffe, Bd. 58, pp. 827–832, (1968), R. Kubens et al.
Dokl Akad. Nauk SSSR, vol. 202, pp. 347–350, (1972), V. V. Korsak et al.

Primary Examiner—Howard E. Schain
Attorney, Agent, or Firm—Richard C. Stewart; Gerhard H. Fuchs

[57] ABSTRACT

Modified phenolic resins and cured resins prepared therefrom.

40 Claims, No Drawings

THERMOSETTABLE MODIFIED PHENOLIC IMIDE RESINS

BACKGROUND OF THE INVENTION

1. Field of the Invention

This invention relates to certain novel modified phenolic resins. More particularly, this invention relates to such resins which have improved properties.

2. Prior Art

Phenolic resins are a class of synthetic materials that have grown continuously in terms of volume and applications for over several decades. The building blocks used in greatest volume are phenol and formaldehyde. Other important phenolic starting materials are the alkyl-substituted phenols, including cresols, xylenols, p-tert-butyl-phenol, p-phenylphenol, and nonylphenol. Diphenols, eg, resorcinol (1,3-benzendiol) and bisphenol-A [bis-A or 2,2-bis(4-hydroxylphenyl)propane], are employed in smaller quantities for applications requiring special properties. In addition to formaldehyde, acetaldehyde or furfuraldehyde sometimes are employed but in much smaller quantities. The greater latitude in molecular structure, which is provided by varying the raw materials, chemistry, and manufacturing process, has made possible an extremely large number of applications for these products as a results of the array of physical properties that arise from the synthetic options.

The early investigation of the reaction of phenol and formaldehyde began with the work of von Baeyer and others in the early 1870s as an extension of phenolbased dye chemistry. The initial experiments resulted in soluble, amorphous products whose properties elicited little interest. Insoluble, cross-linked products were reported in the late 1880s, but these products also were not perceived us useful materials. In 1899, the first patent for a phenolic-resin product intended for use as a hard-rubber substitute was granted. The first commerical product was introduced as a shellac substitute by the Louis Bluner Company in the early 1900's. Process patents were issued in 1894 and 1895 for ortho- and para-methylolphenol, respectively.

Key innovations in early phenolic-resin manufacture included control of the molecular structure and the use of heat and pressure to achieve desirable physical properties in filled compositions. Studies in the use of acidic or basic catalysts and of changes in the molar ratio of formaldehyde to phenol resulted in the definition of two classes of polymeric materials which are referred to as Bakelite resins. Caustic-catalyzed products, which are prepared with greater than a 1:1 mol ratio of formaldehyde to phenol, can be used to form cross-linked, insoluble, and infusible compositions in a controlled fashion. With less than a 1:1 mol ratio of formaldehyde to phenol, the resultant products remain soluble; furthermore, acid catalysis yields permanently stable compositions, whereas base-catalyzed materials can be advanced in molecular weight and viscosity. Possibly of greatest importance to early commercialization, however, was the reduction to practice of the use of heat and pressure to produce essentially void-free molding compositions.

Resole resins are made with an alkaline catalyst and a molar excess of formaldehyde. Novolak or novolac resins are prepared with an acid catalyst and less than one mole of formaldehyde per mole of phenol. The initial reaction involved in the preparation of resolated novolaks is carried out with an acid catalyst and less than a 1:1 mol ratio of formaldehyde to phenol. After formation of the novolak, the pH is adjusted so that the reaction mixture is basic and additional formaldehyde is added. Resoles and resolated novolaks are inherently thermosetting and require no curing agent for advancement. Novolaks, by comparison, are thermoplastic and require the addtion of a curing agent, the most common being either hexamethylenetetramine or a resole. The stages of molecular weight advancement are characterized by liquid or solid phenolic polymer which is soluble in certain organic solvents and is fusible; a solid resin which is insoluble but swelled by organic solvents and, although softened by heat, exhibits essentially no flow; and an insoluble, infusible product which is not swelled by solvents nor softened by heat, ie, the system is in a highly cross-linked state.

Phenolic resins have many uses. For example, such materials are used as bonding agents in friction materials such as brake linings, clutch facings, transmission bonds and the like. For example U.S. Pat. Nos. 4,096,108; 4,268,657; 4,218,361; 4,219,452; and 3,966,670 describe various friction materials in which a phenolic resin is employed as the bonding agent. Phenolics are also used as molding materials, and as coatings and adhesives. Phenolics resins developed for nonflammability and long term temperature stability to 230° C. have been studied in carbon-fiber composites. Potential for such composites lies in advanced aircraft application.

While present day phenolics exhibit several beneficial properties they suffer from a number of disadvantages which restrict their utility. For example, such materials exhibit less than desirable thermal oxidative stability. Other major problems of present day phenolic technology include a need for auxiliary chemicals such as hexamethylene tetraamine to crosslink the phenolic which often results in the production of volatile by-products such as ammonia during crosslinking. Still other problems result from the fact that crosslinking is often extensive and is not controllable.

Various modifications to phenolics have been proposed to obviate certain of the disadvantages attendant to these resins. For example, epichlorohydrin has been reacted with the hydroxyl groups of novalak forming epoxy novalak. Moreover, n-chloro-2-propene has been reacted with the hydroxyl groups of novalak to form the corresponding form methylon resin. Similarly, Japanese patent publication Nos. 59-149918 and 58-34822 describe a method of preparing a phenolic resin containing cyanate groups. In this method, a trialkyl ammonium salt of a phenol novolak is reacted with excess cyanogen halide in an organic solvent.

Polyetherimides are known polymeric compositions. For example, T. Takekoshi, et al., J. Polymer Sci. Chem. Ed. 18, 3069 (1980) and D. M. White, et al., ibid 19, 1635 (1981) discloses the polyetherimides can be prepared by nucleophilic displacement of an activated nitro groups of bisimide group by bisphenol dianion. The resultant polymer is a low molecular weight thermoplastic polymer.

SUMMARY OF THE INVENTION

The present invention is directed to a modified phenolic resin of the Formula I:

Formula I

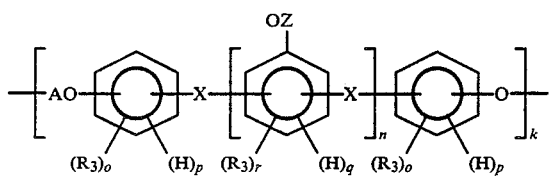

wherein:

A is an aromatic moieties of the formula:

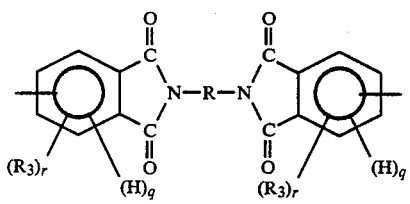

o and p are the same or different at each occurrence, and are positive whole numbers from 0 to 4, with the proviso that the sum of o and p at each occurrence is equal to 4;

n is a positive whole number greater than or equal to 1;

k is a positive whole number equal to or greater than 1;

q and r are the same or different at each occurrence and are whole numbers from 0 to 3, with the proviso that the sum of q and r at each occurrence is equal to 3;

—R— is a divalent radical;

Z is hydrogen, or hydrogen and —CN, or hydrogen and an aromatic moiety selected from the group consisting of:

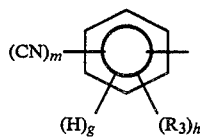

m is a positive whole number from 2 to about 4, with the proviso that at least two of the cyano groups are substituted at adjacent carbon atoms;

g and h are the same or different at each occurrence and are positive whole numbers from 0 to 4 with the provision that the sum of g and h at each occurrence is equal to 4;

X is a divalent organic radical; and $R_3$ is the same or different at each occurrence and is a substituent other than hydrogen which is unreactive under conditions necessary to crosslink the cyanurate moieties.

Another aspect of this invention relates to precured compositions containing the above-referenced modified phenolic resin, and to cured, completely cured and incompletely cured compositions formed by the curing of the modified phenolic resin of this invention to varying degrees. For example, the modified phenolic resin can be conveniently cured by treatment of those embodiments in which Z is hydrogen with a suitable curing agent as for example hexamethylene tetramine paraformaldehyde, or resole, or by heating those embodiments of the invention where Z is other than hydrogen.

As used herein, "completely cured" modified phenolic resins are those in which less than about 20 mole percent of the original cyano groups remain unreacted as determined by the method of infrared spectrophotometry; "precured" modified phenolic resins are those in which substantially about 100 mole percent of the original cyano groups are unreacted as determined by the method of infrared spectrophotometry; "partially cured" modified phenolic resins are those in which from about 40 to about 70 mole percent of the original cyano groups are unreacted as determined by infrared spectrophotometry; and "incompletely cured" modified phenolic resins are those in which from about 40 to about 20 mole percent of the original cyano groups are unreacted as determined by infrared spectrophotometry. Still, another aspect of this invention related to such compositions comprising said phenolic resin in admixture with one or more other materials as for example, thermosetting and thermoplastic polymers such as kevlar and polyethylene, fillers as for example boron, carbon, and the like.

The cured resin derived from modified phenolic resin of this invention, and the modified phenolic resin of this invention exhibit several advantages over conventional phenolic resins. For example, certain of these materials are self crosslinking, and thus do not require auxilliary chemicals for crosslinking. Moreover, the cross-linked material has greater oxidative, mechanical and thermal stability as compared to conventional phenolic resins, and no volatile, potentially environmentally hazardous by-products are produced during crosslinking. Furthermore, the claimed cross-linked phenolic resins have higher char forming properties than the conventional phenolic resins and polyimide resins.

DESCRIPTION OF THE PREFERRED EMBODIMENTS

The phenolic resin of this invention is of the Formula I.

Formula 1

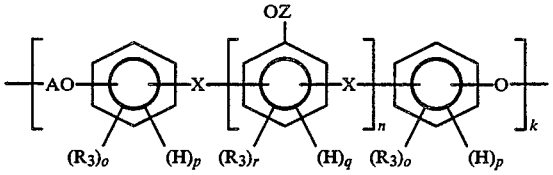

wherein:

—A—, $R_3$, —X—, —R—, Z, n, k, r, q, o and p are described above.

—A— is a divalent radical of the formula:

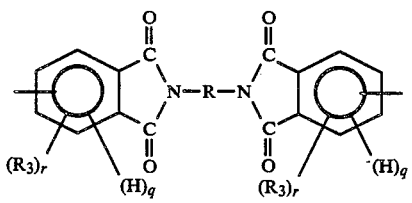

—R— groups include divalent aromatic and aliphatic moieties. Illustrative of such groups are aliphatic groups such as ethylene, methylene, 2,5-dimethylhexamethylene, 4,4-dimethylheptamethylene, propylene, 1,4-butylene, 2,2'-diethylene sulfone, 2,2'-diethylene sulfide, 3,3'-dipropylene sulfone, 3,3'-dipropylene ether, 1,3-butylene, 1,6-hexylene, 1,7-heptalene, 1,5-pentylene, 1,8-octalene, 3-methoxy-hexamethylene, 3-methyl-hexamethylene, 3-methyl heptamethylene, 2,2-dimethyl-1,3-propylene, 1,10-decalene, and the like; cycloaliphatic such as 1,3-cyclophentyl, 1,4-cyclohexyl, 1,4-dimethylene cyclohexylene and the like; and arylene such as 1,4-phenylene, 1,5-naphthalene, 1,3-benzenedimethylene, 1,4-benzenedimethylene, 2,2-bis-(4-phenylene)propane, bis-4(4-phenylene)methane, 4,4-diphenylene dimethylene 4,4'-phenylene propane, 4,4'-phenylene sulfone, 4,4'-phenylene sulfide, 4,4'-phenylene ether and the like; and alkylene terminated poly diorganosiloxanes such as bis-(3-propylene)tetramethyldisiloxane, bis-(4-butylene)tetramethyldisiloxane and the like.

$R_3$ is an inert substituent. Illustrative of suitable $R_3$ groups are such inert substituents as halogen, trihalomethyl, alkyl, alkoxy, phenyl and the like.

—X— is a divalent organic radical. Illustrative of suitable X groups are alkylene such as methylene, ethylmethylene, 2-ethylpentylmethylene, methylmethylene, isopropylmethylene, isobutylmethylene, pentylmethylene, furylmethylene, and the like; arylene such as 1,3-benzenedimethylene, 2,2-bis-(4-phenylene)propane, 4-methoxyphenylmethylene, bis-(4-phenylene)methane, 4,4-diphenylenes dimethylethane and the like; and cycloalkylene such as cycloheylene, cycooctylene, 1,3-cyclohexandimethylene, and the like;

Z is hydrogen, —CN or a moiety of the formula:

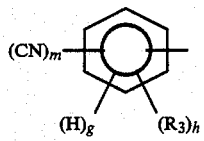

Illustrative of useful cyano substituted aromatic moieties are 2,3-dicyanophenyl, 2,3,5-tricyanophenyl, 2,3-dicyano-5-chlorophenyl, 4,5-dicyanophenyl, 7,8-dicyanonaphthyl, 5,6-dicyanonaphthyl, 3,4-dicyanonaphthyl, 5,6-dicyano, 7,8-dichloronaphthyl, 3,4-dicyano-2-methylphenyl, 4,5-dicyano-2-methoxyphenyl and the like.

In the preferred embodiments of this invention:

A is an unsubstituted or substituted aromatic moieties of the formula:

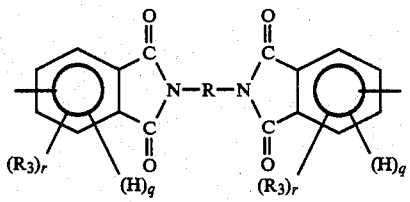

wherein:

—R— is a divalent organic rodical selected from the group consisting of divalent aromatic rodicals having from 6 to about 20 carbon atoms, alkylene having from 1 to about 20 carbon atoms, cycloalkylene having from 3 to about 20 carbon atoms, polydiorganosiloxanes terminated with alkylene having from about 2 to about 8 carbon atims, and divlalent radicals of the formula:

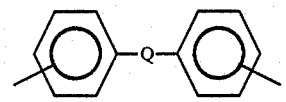

wherein Q is selected from the group consisting of:

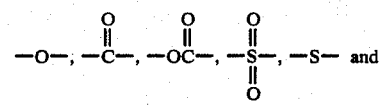

$C_yH_{2y}$, where y is from 1 to about 20.

q and r are the same or different at each occurence and are positive whole numbers from 0 to 3, with the proviso that the sum of q and r at each occurrence is 3;

o and p are the same or different and are positive whole numbers from 0 to 4, with the proviso that the sum of o and p at each occurrence is 4;

Z is hydrogen or hydrogen and CN, or hydrogen and an aromatic moiety of the formula:

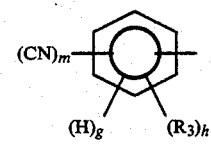

provided that no more than from about 20 to about 80 mole percent of Z is —CN or said aromatic moiety; wherein m is from 2 to about 4 with the proviso that at least two of the said cyano groups are substituted at adjacent carbon atoms;

g and h are the same or different at each occurrence and are whole numbers from 0 to 4, with the proviso that the sum of g and h is equal to 4, X is substituted or unsubstituted methylene or 1,4-phenyldimethylene wherein permissible substituents are alkyl, halogen or furyl;

$R_3$ is alkyl; and n and k are the same or different and are positive number from 1 to about 10.

Amongst the preferred embodiments particularly preferred are those embodiments of the above formula in which:

A is selected from the group consisting of aromatic moieties of the formula:

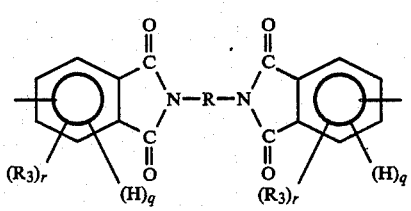

—R— is a divalent radical selected from the group consisting of divalent aromatic radicals and divalent radicals of the formula:

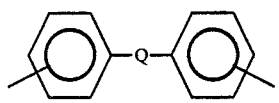

r is the same or different at each occurrence and is 0 or 1;

q is the same or different at each occurrence and is 1 to 3;

o is the same or different at each occurrence and is 0 to 1;

p is the same or different at each occurrence and is 1 to 4;

Z is hydrogen, hydrogen and —CN or hydrogen and an aromatic moiety of the formula:

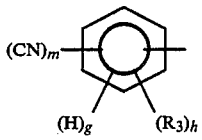

wherein:
m is 2 or 3;
h is 0 or 1;
g is 1 to 3;
with the proviso that no more than from about 35 to about 50 mole percent of Z moieties are —CN or said aromatic moiety;

X is methylene, methylene substitued with alkyl having from about 1 to about 10 carbon atoms, halogen, furfuryl and xylene;

R₃ is methyl or ethyl; and
n and k are the same or different and are 1 to about 6.

Amongst these particularly preferred embodiments, most preferred are those embodiments wherein A is a moiety of the formula:

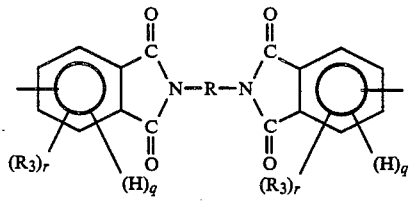

—R— is selected from the group consisting of phenylene, diphenylene, naphthalene and divalent rodicals of the formula:

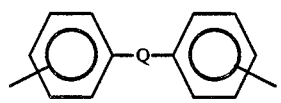

where Q is selected from the group consisting of —O—,

—S— and C$_y$H$_{2y}$ where y is from 1 to about 10;

o is O;
p is 4;
n and k are the same or different and are 1 to about 4;
h is 3;
Z is hydrogen, or hydrogen and —CN or hydrogen and an aromatic moiety of the formula:

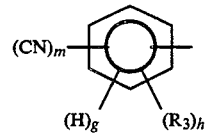

wherein:
m is 2;
o is O; and
p is 3;
with the proviso that when Z is —CN or said aromatic moiety from about 35 to 40 mole percent of Z is —CN or said aromatic moiety and the remainder of said Z moieties are hydrogen.
g is 0;
q is 0;
X is a moiety of the formula: —CH$_2$—, —CF$_2$—,

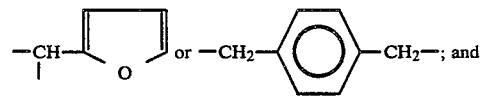

and
r is 3.

The modified phenolic resin of the invention of the Formula I in which Z is hydrogen prepared by a nucleophilic displacement reaction. In this reaction, an aromatic compound of the formula:

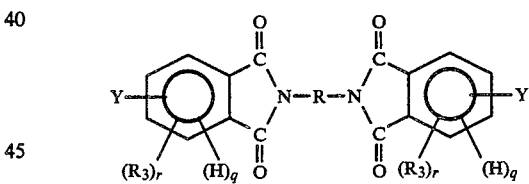

in which R₃, m, o, p are as defined above; and Y is a leaving group such as fluoro or nitro, with an alkali metal phenolic salt of the formula:

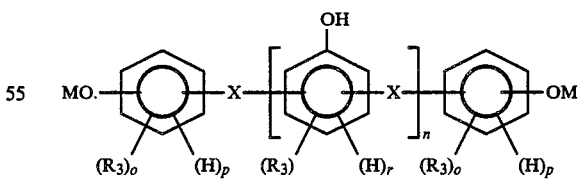

wherein R₃, o, p, —X—, q, r, and n are as defined above M is an alkali metal cation, preferably under nitrogen in the presence of an aprotic solvent.

Reaction temperatures can vary widely and are preferably from about 40° C. to about 150° C. with aqitation and more preferably from about 50° C. to about 60° C.

Useful aprotic solvents can vary widely, the only requirement being that the solvent is inert under the reaction conditions. Illustration of aprotic solvents useful in the conduct of this reaction are N,N-dimethyl acetamide, N,N-dimethyl formamide, N-methyl-2-pyrrolidone, cyclohexanone, and dimethyl sulfoxide or a mixture of such solvents. The preferred solvent is N-methyl 2-pyrrolidone.

Reaction times can vary considerably and will depend upon such factors as the degree of agitation, temperature, nature and proportion of reactants and the like. Preferred reaction times are from about 4 hours to about 6 hours. The reaction product can be recovered by conventional means. For example, the crude polymeric product can be recovered by pouring the reaction mixture into water. The final polymer can be reprecipitated by standard technique such as redissolving in N-methyl 1,2-pyrrolidone and reprecipitating from water. The product can then be dried in vacuum oven for 24 hr.

The aromatic compounds and the phenolic resins used in the preparation of the modified phenolic resins of this invention are known materials, which can be obtained commercially or prepared by known procedures. For example, phenolic resins can be conveniently prepared by reacting an aldehyde such as formaldehyde and a phenol such as phenol in the presence of an acid or base catalyst, and useful aromatic compounds can be prepared by reacting phthalic anhydride substituted with an appropriate leaving group such as nitro, fluoro, chloro, or bromo group with an organic diamine in an acidic solvent such as acetic acid under reflux condition.

The phenolic resins of Formula I wherein Z is —CN or an aromatic moiety can be prepared by a nucleophilic displacement reaction. In this reaction, the resin of Formula I in which Z is hydrogen is treated with an alkali metal hydroxide compound, preferably sodium hydroxide in an aprotic solvent to form the corresponding alkali metal phenolic salt of the formula:

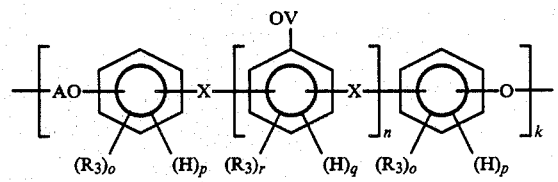

wherein $R_3$ n, o, k, n, —R—, —A—, and —X— are as described above V is hydrogen or M, with the proviso that from about 20 to about 80 mole percent of V is M, and preferably from about 35 to about 50 mole percent of V is M and more prefereably from about 35 to about 40 mole percent of V is M. The alkali metal phenolic salt is then reacted with a cyanogen halide (preferably cyanogen chloride or cyanogen bromide) when Z is —CN, or with an aromatic compounds of the formula:

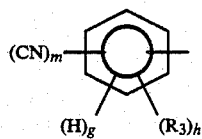

wherein $R_3$, H, o, p m and y are as described above preferably under nitrogen in the presence of an aprotic solvent.

Reaction temperatures can vary widely and are preferably from about 0° C. to about 120° C. with agitation and more preferably from about 0° C. to about 30° C.

Useful aprotic solvents can vary widely, the only requirement being that the solvent is inert under the reaction conditions. Illustrative of aprotic solvents useful in the conduct of this reaction are N,N-dimethyl acetamide, N,N-dimethyl formamide, N-methyl 2-pyrrolidone, cyclohexanone, and dimethyl sulfoxide. The preferred solvent is N-methyl 2-pyrrolidone.

Reaction times can vary considerably and will depend upon such factors as the degree of agitation, temperature, nature and proportion of reactants and the like. Preferred reaction times preferably are from about 4 hours to about 6 hours.

The reaction product can be recovered by conventional means. For example, the crude polymeric product can be recovered by pouring the reaction mixture into water. The final polymer can be reprecipitated by standard technique such as reprecipitating from water. The product can then be dried in vacuum oven for 24 hr.

Another aspect of this invention relates to precured compositions containing the above-referenced modified phenolic resin, and to cured, completely cured and incompletely cured compositions formed by the curing of the modified phenolic resin of this invention to varying degrees. As used herein, "completely cure" modified phenolic resin are those in which less than about 20 mole percent of the original cyano groups or hydroxyl groups remain unreacted as determined by the method of infrared spectrophotometry; "precured" modified phenolic resins are those in which substantially about 100 mole percent of the original cyano groups or hydroxyl groups are unreacted as determined by the method of infrared spectrophotometry; "partially cured" modified phenolic resins are those in which from about 20 mole percent of the original cyano groups or hydroxyl groups are unreacted as determined by infrared spectrophotometry.

Phenolic resins according to Formula I in which Z is hydrogen can be partially cured, completely cured or incompletely cured by reacting the resin with a conventional curing agent for phenolic resin. Such curing agents are well known to those of skill in the art. Such curing agents and curing processes are described in detail in U.S. Pat. Nos. 4,096,108; 4,219,452; 4,218,361; and 4,268,657, and G. L. Brode, "Phenolic Resins", in Encyclopedia of Chemical Technology, 3rd Ed, Vol 17, p. 384 (1982).

The partially cured, completely cured and incompletely cured phenolic resins of Formula I wherein Z is —CN are formed by a "cyclotrimerization" reaction. By "cyclotrimerization" is meant forming a cyanate ring system by the chain extension polymerization of three aromatic cyanate groups to form a crosslinked triazine ring systen which comprises the following basic repeat unit:

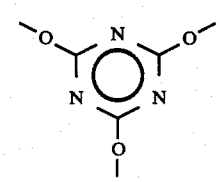

wherein the open valencies are bonded to the phenyl resin of a phenolic resin. Cyclotrimerization reactions are described in detail in *Kurt-stoffe*, Bd. 58, pp. 827–832 (1968) by R. Kubens et al., and *Pukl*, Akad. Nauk SSSR, Vol. 202, pp. 347–350 (1972) by V. V. Korshak, et al., U.S. Pat. No. 4,046,796, and German Offenlegunhschrifte Nos. 2,549,529; 2,546,296; and 2,546,315.

The partially cured, completely cured and incompletely cured phenolic resin of Formula I wherein Z is an aromatic function are formed by reaction between four adjacent pairs of cyano groups from four aromatic residues. The modified resin of Formula I wherein Z is an cyano substituted aromatic function can be conveniently crosslinked using the procedures described in Arthur Snow and James R. Griffith, "Synthesis and Characterization of Heteroatom-Bridged Metal-Free Phthalacyamine Network Polymer and Model Compounds," Macromolecule; Vol. 17, pp. 1614–1624 (1984), and U.S. Pat. No. 4,304,896.

A reinforced and/or filled compositions comprising the completely cured, partially cured, and incompletely cured compositions of this invention, precured compositions which may be used in the preparation of such reinforced compositions are also part of the invention disclosed herein. The completely cured, precured, partially cured, and incompletely cured compositions as described, may contain fibers for use in where the structural strength and integrity of a structure has to be maintained, and for other purposes known to those of skill in the art. Any suitable filler known to those of skill in the art can be used. Such fillers may be selected from a wide variety of organic and nonorganic materials such as polymers, minerals, metals, metal oxides, siliceous materials and metal salts. Illustrative of useful fillers are fiber glass, steel, asbestos fibers, aramide, boron and carbon fibers, as well as plate like, fibrous and particulate forms of alumina, bross powder, aluminum hydrates, iron oxide, feldspar, lead oxides, asbestos, talc, barytes, calcium carbonates, clay, carbon black, quartz, novaculite and other forms of silica, kaolinite, aluminum silicate bentonite, garnet, mica, saponite, beidelite, calcium oxide, fused silica, calcium hydroxide, etc. Other useful fillers include thermoplastic polymer as for example polyesters, polyimides, polyamides, polysulfones, polyaramids, polyester carbonates, polyethers, polyethersulfones, polyethylene, polypropylene, polycarbonates, polyetherimides, polysulfides, polyacrylates, polyvinyls and the like. The foregoing recited fillers are illustrative only and are not meant to limit the scope of the fillers that can be utilized in this invention. Methods for producing reinforced and/or filled compositions include melt blending, extrusion and molding processes, simple mixing and dispersion of both materials in a suitable medium by methods known in the art.

The precured, completely cured, incompletely cured and partially cured compositions of this invention are useful in forming a wide variety of industrial products, including shaped articles, as produced by known shaping processes. Precured compositions can be formed (i.e., shaped) into articles which can then be cured to form completely cured, incompletely cured and partially-cured articles. Shaped articles produced from the polymer composition include windscreens such as windshields, structural parts, canopies, door windows wire housing and the like. The shaping process can be any process known to one skilled in the art, such as injection, blow or extrusion molding. Another use of the crosslinked polymer of the member is a binding agent in the manufacture of friction materials such as brake linings, clutch facings and transmission bands, as for example those described in U.S. Pat. Nos. 3,966,670, 4,268,657, or 4,281,361. Still other uses of the polymers of this invention are molding materials, composites for use in the manufacture of structural parts and the like.

The following specific examples are presented to more particularly illustrate the invention and should not be construed as a limitation on the scope of the invention.

EXAMPLE 1

A 25 g sample of 4 nitrophthalic anhydride (0.13 mole) was dissolved in 200 ml of acetic acid. A 12.8 g sample of 4,4'-diaminodiphenylmethane was added to the above solution under nitrogen atmosphere. The resulting mixture was reflux for 6 hrs. The product was cooled to room temperature and poured into water. A yellow precipitate formed, which was filtered, thoroughly washed with water and dried in vacuum oven at 100° C. for 26 hrs.

EXAMPLE 2

A 7.8 g sample of phenol-formaldehyde resin of number average molecular weight 620 was dissolved in 35 ml of N-methyl 2-pyrolidone. To this solution was added 2 g of 50% aqueous sodium hydroxide, followed by the addition of 25 ml of toluene. The mixture was heated to 110°–120° C. under nitrogen to remove water with Dean-Stark trap over a period of 2 hr. The reaction mixture was cooled to 80° C. and g of the product of Example 1 was added gradually to the mixture. An additional 25 ml of N-methyl 2 pyrrolidone was added and nitro displacement polymerization was carried out for 18 hrs. The mixture was cooled to room temperature and poured to 5% cold HCl solution. A yellow precipitate was formed. The product was filtered and dried in vacuum oven at 100° C. for 26 hrs.

EXAMPLE 3

Phenolic-polyimide (5 g) of example 5 was dissolved in 20 ml of N-methyl 2 pyrolidone at room temperature under a nitrogen atmosphere. To this mixture, 3 ml of triethylamine were added and stirred for 1 hr. 1×1 g of cyanogen bromide was dissolved in 10 ml of N-methyl 2-pyrolidene and added gradually to the above mixture, when a exotherm of 14° C. was noticed. The mixture turned to a deep orange shade. After 3 hrs. the mixture was precipitated into cold water. The resulting product, in which was a yellow solid, was dried at 110° C. in vacuum oven for 24 hrs.

EXAMPLE 4

A series of experiments were carried out for the purpose of evaluating the thermal characteristics of certain embodiments of this invention and to compare same to the base phenolic resin. In these experiments, thermogravimentric analysis (TGA) was carried out in an argon atmosphere to determine the weight loss of a sample as a function of temperature and the % Char at 900° C. These experiments were carried out using a Dupont-1090 thermogravimeter at a heating rate of 10° C./min. The typical sample size was 30–34 mg. The results of these experiments we set forth in the following Table I.

TABLE I

| Exp No. | Sample | % Weight Loss at °C. | | | | | | | % Char |
|---|---|---|---|---|---|---|---|---|---|
| | | 100° C. | 200° C. | 300° C. | 400° C. | 450° C. | 500° C. | 900° C. | |
| 1. | RD-27 Novolac | 0.2 | 0.6 | 4.1 | 26.4 | 34.6 | 38.6 | 55.2 | 44.8 at 900° C. |
| 2. | Ex. 2 | 0 | 0 | 0 | 5.2 | 12.3 | 18 | — | 50 at 700° C. |
| 3. | Ex. 3 | 0 | 0 | 0 | 2.0 | 5 | 10 | — | 65 at 700° C. |

What is claimed is:

1. A modified phenolic resin of the formula:

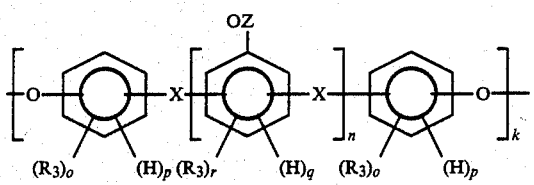

wherein:

—A— is a divalent aromatic moiety of the formula:

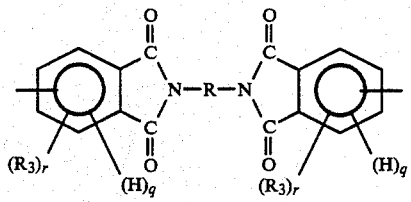

wherein:

—R— is a divalent organic radical;

o and p are the same or different at each occurrence and are whole numbers from 0 to 4, with the proviso that the sum of o and p at each occurrence is equal to 4;

q and r are the same or different at each occurrence and are whole numbers from 0 to 3 with the proviso that the sum of q and r at each occurrence is equal to 3;

Z is hydrogen, or hydrogen and —CN or hydrogen and a cyano substituted aromatic moiety of the formula:

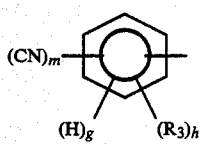

X is a divalent organic radical;

$R_3$ is the same or different at each occurrence and is a substituent other than hydrogen which is unreactive under conditions necessary to cure the said resin;

m is a positive whole number from 2 to about 4, with the proviso that at least two of the cyano groups are substituted at adjacent carbon atoms;

g and h are the same or different at each occurrence and are positive whole numbers from 0 to 4, provided that the sum of g and h is equal to 4; and n and k are the same or different and are positive whole numbers.

2. A resin according to claim 1 wherein X is substituted or unsubstituted methylene or 1,4-phenyldimethylene, wherein permissible substituents are alkyl having from 1 to about 10 carbon atoms halogen and furyl.

3. A resin according to claim 2 wherein X is a moiety of the formula:

$-CH_2-$, $-CF_2-$, $-CH-$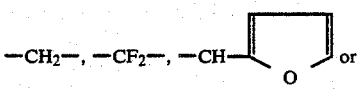 or $-CH_2-\bigcirc-CH_2-$

4. A resin according to claim 1 wherein n is from 1 to about 10.

5. A resin according to claim 4 wherein n is from 1 to about 6.

6. A resin according to claim 5 wherein n is from 1 to about 4.

7. A resin according to claim 1 wherein:
r is 0 or 1; and
q is 1 to 3.

8. A resin according to claim 7 wherein:
q is 0; and
r is 3.

9. A resin according to claim 1 wherein:
o is o is 1; and
p is 1 to 4.

10. A resin according to claim 9 wherein:
o is o; and
p is 4.

11. A resin according to claim 1 wherein $R_3$ is alkyl.

12. A resin according to claim 11 wherein $R_3$ is methyl or ethyl.

13. A resin according to claim 1 wherein k is from about 1 to about 10.

14. A resin according to claim 13 wherein k is from about 1 to about 6.

15. A resin according to claim 14 wherein k is from about 1 to about 4.

16. A resin according to claim 1 wherein —R— is a divalent organic radical selected from the group consisting of divalent aromatic radicals having from 6 to about 20 carbon atoms, alkylene having from 1 to about 20 carbon atoms, cycloalkylene having from 3 to about 20 carbon atoms, polydiorganosiloxanes terminated with alkylene having from about 2 to about 8 carbon atoms and divalent radicals of the formula:

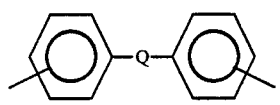

wherein Q is selected from the group consisting of:

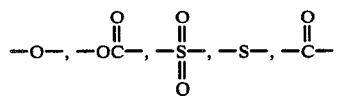

and $C_yH_{2y}$ where y is 1 to about 20.

17. A resin according to claim 16 wherein —R— is a divalent radical selected from the group consisting of divalent aromatic radicals and divalent of the formula:

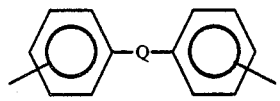

18. A resin according to claim 17 wherein —R— is selected from the group consisting of phenylene, diphenylene, naphthalene and a divalent radical of the formula:

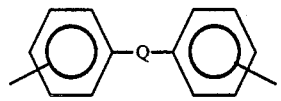

wherein Q is selected from the group consisting of

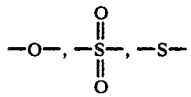

and $C_yH_{2y}$ where y is from 1 to about 10.

19. A resin according to claim 18 wherein —R— is phenylene.

20. A resin according to claim 18 wherein —R— is a divalent radical of the formula:

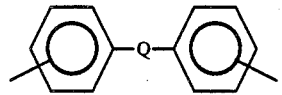

21. A resin according to claim 20 wherein Q is —O— or $C_yH_{2y}$ where y is 1 to 5.

22. A resin according to claim 21 wherein Q is —O—.

23. A resin according to claim 22 wherein Q is $C_yH_{2y}$.

24. A resin according to claim 17 wherein:
o to 0 to 1; and
h is 1 to 4.

25. A resin according to claim 24 wherein:
m is 2;
2 is 4; and
h is 0.

26. A resin according to claim 1 wherein Z is hydrogen.

27. A resin according to claim 1 wherein from about 20 to about 80 mole percent of Z are —CN and the remainder are hydrogen.

28. A resin according to claim 27 wherein from about 35 to about 50 mole percent of Z are —CN and the remainder are hydrogen.

29. A resin according to claim 1 wherein Z is from about 20 to about 80 mole percent of a cyano substituted aromatic moiety of the formula:

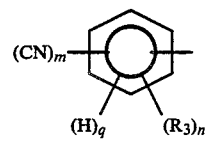

and the remainder of Z groups are hydrogen.

30. A resin according to claim 29 wherein Z is from about 35 to about 50 mole percent of said cyano substituted aromatic moiety.

31. A composition comprising a modified resin of according to claim 1 and one or more fibrous or particulate fillers.

32. A completely cured composition formed by reacting a phenolic resin of claim 26 with a crosslinking agent to the extent sufficient to form said completely cured composition.

33. An incompletely cured composition formed by reacting a phenolic resin of claim 26 with a crosslinking agent to the extent sufficient to form said incompletely cured composition.

34. A partially cured composition formed by reacting a phenolic resin of claim 26 with a crosslinking agent to the extent sufficient to form said partially cured composition.

35. A completely cured composition formed by crosslinking the phenolic resin of claim 27 to the extent sufficient to form said completely cured composition.

36. An incompletely cured composition formed by crosslinking the phenolic resin of claim 17 to the extent sufficient to form said incompletely cured composition.

37. A partially cured composition formed by crosslinking the phenolic resin of claim 27 to the extent sufficient to form said partially cured composition.

38. A completely cured composition formed by crosslinking the phenolic resin of claim 29 to the extent sufficient to form said completely cured composition.

39. An incompletely cured composition formed by crosslinking the phenolic resin of claim 29 to the extent sufficient to form said incompletely cured composition.

40. A partially cured composition formed by crosslinking the phenolic resin of claim 29 to the extent sufficient to form said partially cured composition.

* * * * *

UNITED STATES PATENT AND TRADEMARK OFFICE
CERTIFICATE OF CORRECTION

PATENT NO. : 4,650,839
DATED : March 17, 1987
INVENTOR(S) : S. Das et al.

It is certified that error appears in the above-identified patent and that said Letters Patent is hereby corrected as shown below:

Col. 13, lines 17-24: Formula reads:

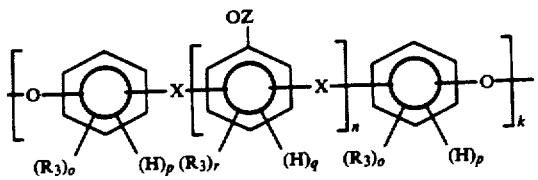

Should read: --

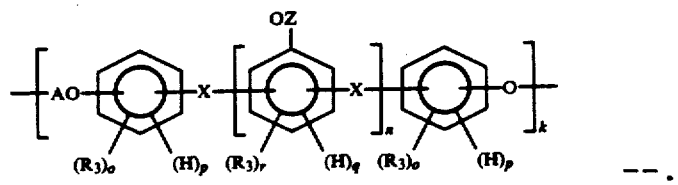

--.

Signed and Sealed this

Nineteenth Day of January, 1988

Attest:

DONALD J. QUIGG

Attesting Officer

Commissioner of Patents and Trademarks